United States Patent
Yamaguchi et al.

(10) Patent No.: US 6,371,361 B1
(45) Date of Patent: *Apr. 16, 2002

(54) SOLDERING ALLOY, CREAM SOLDER AND SOLDERING METHOD

(75) Inventors: Atsushi Yamaguchi, Moriquichi; Tetsuo Fukushima, Katano, both of (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/252,787

(22) Filed: Feb. 19, 1999

Related U.S. Application Data

(63) Continuation-in-part of application No. 08/792,128, filed on Jan. 31, 1997, now Pat. No. 5,918,795.

(30) Foreign Application Priority Data

Feb. 9, 1996 (JP) .................................. 8-23547

(51) Int. Cl.[7] ........................... B23K 28/00; C22C 13/00
(52) U.S. Cl. ...................... 228/200; 420/557; 420/560; 420/562
(58) Field of Search .................. 228/200; 420/561, 420/562, 557, 560

(56) References Cited

U.S. PATENT DOCUMENTS

| | | | | |
|---|---|---|---|---|
| 1,437,641 A | * | 1/1922 | Ferriere et al. | |
| 3,607,253 A | * | 9/1971 | Cain | 75/175 A |
| 3,615,262 A | * | 10/1971 | Eichelman, Jr. et al. | 29/199 |
| 4,347,076 A | * | 8/1982 | Ray et al. | 75/0.5 R |
| 4,613,371 A | * | 9/1986 | Cheney et al. | 75/255 |
| 4,753,688 A | * | 6/1988 | Myers | 148/11.5 R |
| 4,929,423 A | * | 5/1990 | Tucker et al. | 420/561 |
| 5,019,336 A | * | 5/1991 | Lieberman et al. | 420/557 |
| 5,294,242 A | * | 3/1994 | Zurecki et al. | 75/345 |
| 5,328,660 A | * | 7/1994 | Gonya et al. | 420/562 |
| 5,344,607 A | * | 9/1994 | Gonya et al. | 420/562 |
| 5,366,692 A | * | 11/1994 | Ogashiwa | 420/565 |
| 5,429,689 A | * | 7/1995 | Shangguan et al. | 148/400 |
| 5,435,857 A | * | 7/1995 | Han et al. | 148/24 |
| 5,439,639 A | * | 8/1995 | Vianco et al. | 420/562 |
| 5,520,752 A | * | 5/1996 | Lucey, Jr. | 148/400 |
| 5,527,628 A | * | 6/1996 | Anderson et al. | 428/647 |
| 5,658,528 A | * | 8/1997 | Ninomiya et al. | 420/562 |
| 5,730,932 A | * | 3/1998 | Sarkhel et al. | 420/562 |
| 5,733,501 A | * | 3/1998 | Takao et al. | 420/562 |
| 5,843,371 A | * | 12/1998 | Yoo et al. | 420/562 |
| 5,863,493 A | * | 1/1999 | Achari et al. | 420/557 |
| 5,918,795 A | * | 7/1999 | Yamaguchi et al. | 228/200 |
| 5,958,333 A | * | 9/1999 | Matsunaga et al. | 420/562 |
| 5,985,212 A | * | 11/1999 | Hwang et al. | 420/560 |
| 6,077,477 A | * | 6/2000 | Sakai et al. | 420/560 |
| 6,184,475 B1 | * | 2/2001 | Kitajima et al. | 174/260 |
| 6,267,823 B1 | * | 7/2001 | Yamaguchi et al. | 148/24 |

FOREIGN PATENT DOCUMENTS

| EP | 0144998 | * | 6/1985 | 428/647 |
|---|---|---|---|---|
| EP | 0787559 | * | 6/1997 | 148/400 |

\* cited by examiner

*Primary Examiner*—Tom Dunn
*Assistant Examiner*—L. Edmondson
(74) *Attorney, Agent, or Firm*—Parkhurst & Wendel L.L.P

(57) ABSTRACT

The present invention relates to a soldering alloy composed mainly of Sn and free from lead, a toxic substance. Adding a small quantity of Ag to the soldering alloy can make the alloy structure fine, minimize structural changes of the alloy and increase its thermal fatigue resistance. Adding a small quantity of Bi to the soldering alloy lowers the melting point and improves the alloy's wettability. Further, adding a small quantity of Cu restrains the growth of intermetallic compounds in the bonding interface between a copper land and the solder. Furthermore, addition of a small quantity of In improves the elongation property and thermal fatigue resistance of the alloy.

4 Claims, 3 Drawing Sheets

SOLDERING ALLOY, CREAM SOLDER AND SOLDERING METHOD

REFERENCE TO RELATED APPLICATIONS

This application is a contiuation-in-part of application Ser. No. 08/792,128 filed Jan. 31, 1997, now U.S. Pat. No. 5,918,795.

FIELD OF THE INVENTION

The present invention relates to a soldering alloy, a cream solder for soldering electronic circuit boards, and a process of soldering same.

BACKGROUND OF THE INVENTION

Size reduction and high-density mounting of electronic components are fast-growing trends in electronic parts assembly technology as presently practiced. With this trend, there is an increasing demand for higher reliability and performance of soldering materials especially as they relate to narrow-pitched electronic parts. Meanwhile, there is an increasing concern for environmental protection and there is a movement legally to regulate disposal of industrial wastes, including electronic circuit boards.

A conventional soldering material is depicted in the drawings. FIG. 2 shows an alloy composition of a conventional soldering material and its metallic structure in a bonding interface between a copper land and a solder. In FIG. 2, reference numeral 1 indicates an α-solid-solution Sn layer. 2 indicates β-solid-solution Pb layer. 3 indicates an intermetallic compound composed of $Cu_3Sn$. 4 indicates an intermetallic compound composed of $Cu_6Sn_5$. 5 indicates a Cu land.

The conventional soldering material described above is a eutectic alloy composed of Sn and Pb, having a eutectic point of 183° C., in which Sn accounts for 63 weight % and Pb 37 weight % of the alloy. The alloy contains the α solid solution 1 and the β solid solution 2 in lamellar states. Further, the intermetallic compounds 3 and 4 are formed in the bonding interface between the copper land and the solder.

From the environmental protection view point, however, there is a world-wide rapidly spreading movement to restrict the use of lead (a toxic substance) in Sn—Pb alloy solders. The conventional solder material in which the alloy has a lamellar structure presents a problem because the alloy components swell at high temperatures causing in turn the solder to be stressed. As a result, the interfaces between the alloy components are caused to slide, resulting in soldering cracks. Another problem is that, during soldering or at high temperatures, a rigid and brittle two-layered intermetallic compound is produced in the bonding interface between the solder and the copper land, causing cracks to be formed in the interface.

DISCUSSION OF THE INVENTION

In view of the problems discussed above, it is an object of the present invention to provide a soldering material free from lead, in which alloy components are fine structured and intermetallic compounds are restrained from growing in the bonding interface between a solder and a copper land, so that the changes of the components with the passage of time at high temperatures can be minimized and an excellent thermal fatigue resistance at high temperatures can be obtained.

In order to achieve the aforesaid object, a soldering alloy according to a first aspect of the invention contains Sn, Ag and Bi as the main components, wherein the content of Sn is 83 to 92 weight %, that of Ag is 2.5 to 4.0 weight % and that of Bi is 5 to 18 weight %.

In order to achieve the aforesaid object, a soldering alloy according to a second aspect of the invention contains Sn, Ag, Bi, Cu and In as the main components, wherein the content is 80 to 92 weight %, that of Ag is 2.4 to 4.0 weight %, that of Bi is 5 to 18 weight %, that of Cu is 0.1 to 0.7 weight % and that of In is 0.1 to 1.5 weight %.

According to the first aspect, the soldering alloy is composed mainly of Sn, and addition of a small quantity of Ag thereto enables the tin to provide an alloy having a fine alloy structure and an excellent thermal fatigue resistance at high temperatures. Further, addition of a small quantity of Bi to the alloy enables the compound to lower the melting point and improve the wettability of the alloy.

According to the second aspect, the soldering alloy composed of the same components as of the first aspect further contains a small quantity of Cu, whereby the growth of intermetallic compounds in the bonding interface between the copper land and the solder can be restrained. Further, adding a small quantity of In can improve the elongation property and thermal fatigue resistance of the alloy.

The reason the soldering alloy composition is so limited as mentioned above according to the first and second aspects of the invention is explained below.

Ag is effective to improve the thermal fatigue resistance of the alloy. However, if the quantity of added Ag is less than 2.5 weight %, such an effect cannot be sufficiently displayed. Meanwhile, in order to have the melting point not exceed 220° C., the Ag content has to be 4.0 weight % or less. If the added quantity of Ag exceeds 4.0 weight %, the melting point unfavorably rises rapidly. For this reason, the quantity of added Ag should preferably be kept between 2.5 and 4.0 weight %.

Bi is effective to lower the melting point and to enhance the wettability of the alloy. However, if the quantity of added Bi is less than 5 weight % (based upon the weight of the alloy), such effects cannot be sufficiently displayed. Moreover, if the quantity of added Bi exceeds 18 weight % (based upon the weight of the alloy), adequate soldering strength cannot be obtained. Therefore, the quantity of addition of Bi preferably should be between 5 and 18 weight % based upon the weight of the alloy.

Cu is effective to improve the thermal properties of the alloy and to restrain the formation of intermetallic compounds in the bonding interface between the solder and the copper land. However, if the quantity of Cu added is less than 0.1 weight %, such effect does not occur, and if the quantity of Cu exceeds 0.7 weight %, the alloy becomes rigid and brittle. Therefore, the quantity of addition of Cu is preferably between 0.1 and 0.7 weight % based upon the weight of the alloy.

Adding In effectively improves the elongation property, wettability and the thermal fatigue resistance of the alloy. However, if the quantity of added In is less than 0.1 weight %, such effects do not take place, and if the quantity exceeds 1.5 weight %, the mechanical strength of the alloy is decreased. Therefore, the quantity of addition of In should be preferably between 0.1 to 1.5 weight % based upon the weight of the alloy.

A cream solder according to a third aspect of the present application is prepared by adding and mixing a flux into the alloy of the first or second aspects, and has features similar to those of the solder of the first or second aspects of the invention.

In order to achieve the aforesaid object of the invention, a soldering method according to a fourth aspect of the invention involves solidifying the soldering alloy of the first or second aspects of the invention by quenching, so that the intermetallic compounds can be dispersed finely and the mechanical strength of the alloy is increased.

An applicable quenching method preferably involves a cold air blowing, using a quenching rate of between 5 to 15° C./second, most preferably at or about 10° C./second.

According to the fourth aspect of the invention, quench solidification of the soldering alloy allows the intermetallic compounds of $Ag_3Sn$, $Cu_3Sn$, and $CuSn_5$ to be restrained from growing and to be dispersed finely, whereby the mechanical strength and thermal fatigue resistance of the alloy can be improved.

A fifth aspect of the invention concerns a soldering alloy containing Sn, Ag, Bi and Cu as the main components wherein the Sn content is 77 to 92 weight %, the Ag content is 2.0 to 4.0 weight %, the Bi content is 5 to 18 weight %, and the Cu content is 0.1 to 1.0 weight %. Further related aspects include a cream solder containing the soldering alloy of the fifth aspect of the invention and a soldering method similar to that described above but using the soldering alloy according to the fifth aspect of the invention.

A sixth aspect of the invention concerns a soldering alloy containing Sn, Ag, Bi and In as the main components wherein the Sn content is 76 to 92 weight %, the Ag content is 2.0 to 4.0 weight %, the Bi content is 5 to 18 weight %, and the In content is 0.5 to 4.5 weight %. Further related aspects include a cream solder containing the soldering alloy and a soldering method using same.

A seventh aspect of the invention concerns a soldering alloy containing Sn, Ag, and Bi as the main components wherein the Sn content is 79 to 93 weight %, the Ag content is 2.0 to 3.0 weight %, and the Bi content is 5 to 18 weight % wherein the soldering alloy is solidified by quenching to finely disperse intermetallic compounds causing a resultant increase in the mechanical strength of the soldering alloy.

Yet further aspects of the invention are described herein.

DESCRIPTION OF PREFERRED EMBODIMENTS

Figure 1:
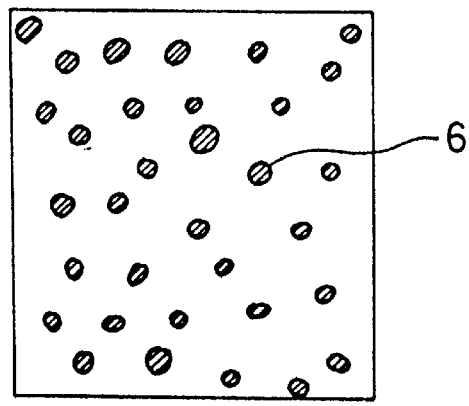
FIG. 1 shows the composition of a soldering alloy used in an embodiment of the present invention.
Figure 2:
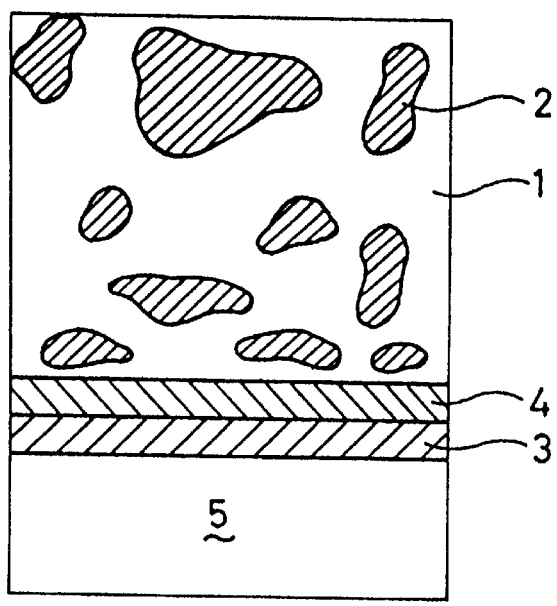
FIG. 2 shows the alloy structure of a conventional solder and its metallic composition in the bonding interface between a copper land and a solder.

An embodiment of the present invention will be described with reference to Examples 1 to 3 and Comparative Examples 1 and 2 as shown in Table 1.

Table 1 shows the composition (in weight %), melting point, wettability, bonding strength and thermal shock resistance of soldering alloys used in Examples 1 to 3 and Comparative Examples 1 and 2.

TABLE 1

| | Components (weight %) | | | | | | Melting point, (° C.) | Wetta-bility (%) | Bonding strength (kgf) | Thermal shock test |
|---|---|---|---|---|---|---|---|---|---|---|
| | Sn | Ag | Bi | Cu | In | Pb | | | | |
| Example | | | | | | | | | | |
| 1 | Remainder | 3.5 | 6 | | | | 210–216 | 88.9 | 1.0 | OK |
| 2 | Remainder | 3 | 10 | 0.5 | 1 | | 197–207 | 88.9 | 1.2 | OK |
| 3 | Remainder | 3 | 15 | 0.5 | 1 | | 187–201 | 89.1 | 1.3 | OK |
| Comparative example | | | | | | | | | | |
| 1 | Remainder | 3.5 | | | | | 221 | 84 | 1.3 | OK |
| 2 | Remainder | | | | | 37 | 183 | 89.8 | 1.0 | NG |

The melting points were measured by thermal analysis for each soldering alloy.

Each alloy was made into a cream solder of the RMA (Rosin Mild-Activated) type for use in air, and wettability, bonding strength and thermal shock resistance tests were conducted on each cream solder.

In evaluating the wettabilty, an OFP with a 0.5 mm pitch was first mounted, and then the peeling strength per lead was measured.

The thermal shock resistance test was conducted using a thermal shock resistance tester under the following conditions: each cream solder specimen was subjected to temperature changes from 40° C. (30 minutes) through normal temperature (5 minutes) up to 80° C. (30 minutes) for 500 cycles. Whether cracks did or did not exist was then determined by evaluating thermal shock resistance.

In preparing a cream solder from the aforementioned soldering alloy, there was no particular restriction in selecting the type of flux to be added, and such fluxes as a flux for air reflow, a flux for $N_2$ reflow, a RA (Rosin Activated) type flux and a RMA (Rosin Mild Activated) type flux were proven to be useful. Among these fluxes, the most preferable was the RMA type flux for use in air; the flux is active and has relatively high anti-corrosiveness.

Comparative Example 1 shows a soldering alloy containing 96.5 weight % of Sn and 3.5 weight % of Ag, while Comparative Example 2 uses a soldering alloy containing 63 weight % of Sn and 37 weight % of Pb.

EXAMPLE 1

The soldering alloy of Example 1 is composed of three components: 90.5 weight % of Sn, 3.5 weight % of Ag, and 6 weight % of Bi.

The soldering alloy was made into a cream solder by adding thereto the RMA type flux for use in air. Then, the melting point, wettability, bonding strength and thermal shock resistance tests were conducted on the cream solder. The results appear in Table 1. A tensile strength test was conducted also, and it was determined that the solder of Example 1 has a tensile strength of 8.3 kgf/mm$^2$. When compared with Comparative Example 2 having a tensile strength of 6.5 kgf/mm$^2$, it can be seen that the solder of Example 1 has a remarkably improved tensile strength.

Subsequently, the solder was quench solidified using a soldering solidifying process. As a result, as shown in FIG. 1, intermetallic compounds (Ag$^3$Sn) 6 were restrained from growing and finely dispersed. Moreover, it was possible to increase the mechanical strength and to improve the thermal fatigue resistance. Intermetallic compounds in the bonding interface between the copper land and the solder could be prevented from increasing. In the quench solidification of the solder, cold air blowing was applied at a cooling rate of about 10° C./second, thereby to cool the soldered joint.

EXAMPLE 2

Example 2 is a soldering alloy composed of the following five components: 85.5 weight % of Sn, 3 weight % of Ag, 10 weight % of Bi, 0.5 weight % of Cu and 1 weight % of In.

The test results are summarized in Table 1. Example 2 shows improvement over the soldering alloy of Example 1 in that the melting point is lowered and the bonding strength is increased.

The soldering alloy of Example 2 was also quench solidified when it was soldered. As a result, further improvement was observed with respect to both mechanical strength and thermal fatigue resistance.

EXAMPLE 3

Example 3 is a soldering alloy composed of the following five components: 80.5 weight % of Sn, 3 weight % of Ag, 15 weight % of Bi, 0.5 weight % of Cu and 1 weight % of In.

The quantity of Bi in the alloy of Example 3 was greater than in the alloy of Example 2. As a result, as shown in Table 1, the melting point was remarkably lowered.

The soldering alloy of Example 3 was also quench solidified when it was soldered. As a result, still further improvement was observed with respect to both mechanical strength and thermal fatigue resistance.

As can be seen from the above, adding a small quantity of Ag to a solder of the present invention that contains Sn as a main component gives a soldering alloy with a fine alloy structure, an alloy that is subjected to minimized structural changes and has an excellent thermal fatigue resistance.

Also, adding a small quantity of Bi can lower the melting point and improve the wettability of the alloy.

Further, addition of a small quantity of Cu makes it possible to restrain the growth of intermetallic compounds in the bonding interface between the copper land and the solder, thereby increasing the alloy's bonding strength.

Still further, addition of a small quantity of In can improve the elongation property and increase the thermal fatigue resistance of the alloy.

It should also be noted that by quench solidifying the solder at the cooling process of the soldering, the alloy structure can be made fine and the intermetallic compounds can be refrained from growing in the bonding interface between the copper land and the solder. The resulting soldering alloy is excellent in both mechanical strength and thermal fatigue resistance.

Still another—and very important—advantage is that the solder of the present invention is free from lead or a similar toxic substance.

Figure 3:
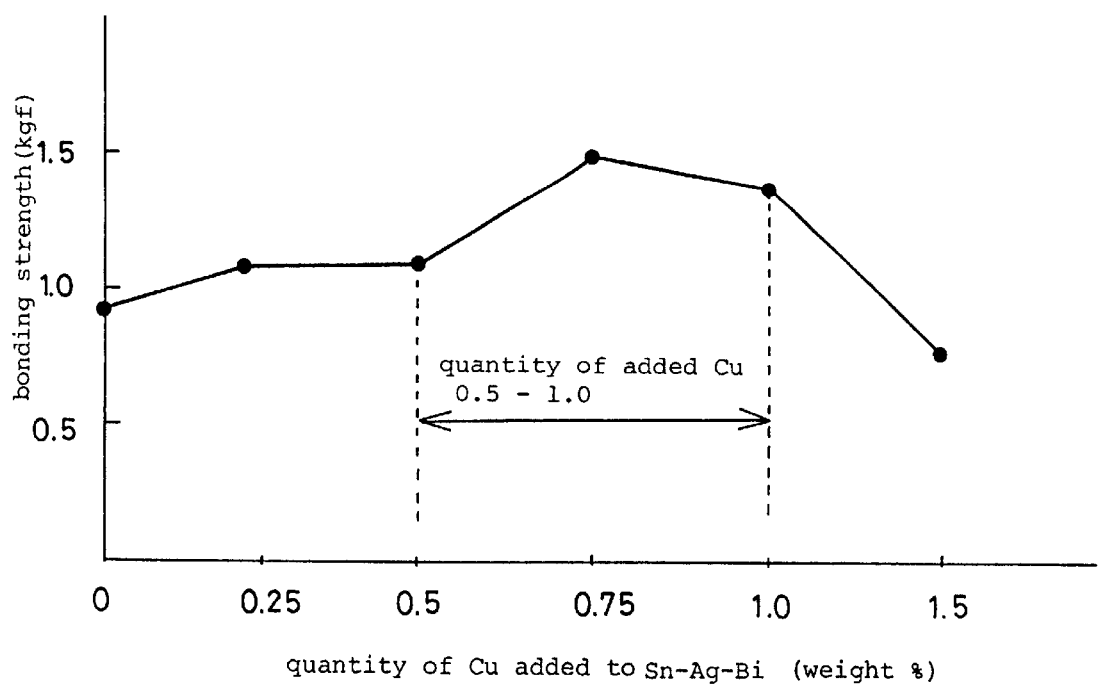
FIG. 3 is a graph of experimental data in which the abscissa represents the amount of Cu, in weight %, added to a Sn—Ag—Bi ternary alloy. The ordinate represents bonding strength in kgf.

FIG. 3 shows that the bonding strength of the alloy increases as the quantity of added Cu increases from 0.5 to 1.0 weight %. And although the quantity of Ag in the alloy in the figure is 3.5 weight %, the inventors have found that they achieve the same result when Ag is present in the alloy in an amount of 2.0 to 4.0 weight %.

Figure 4:
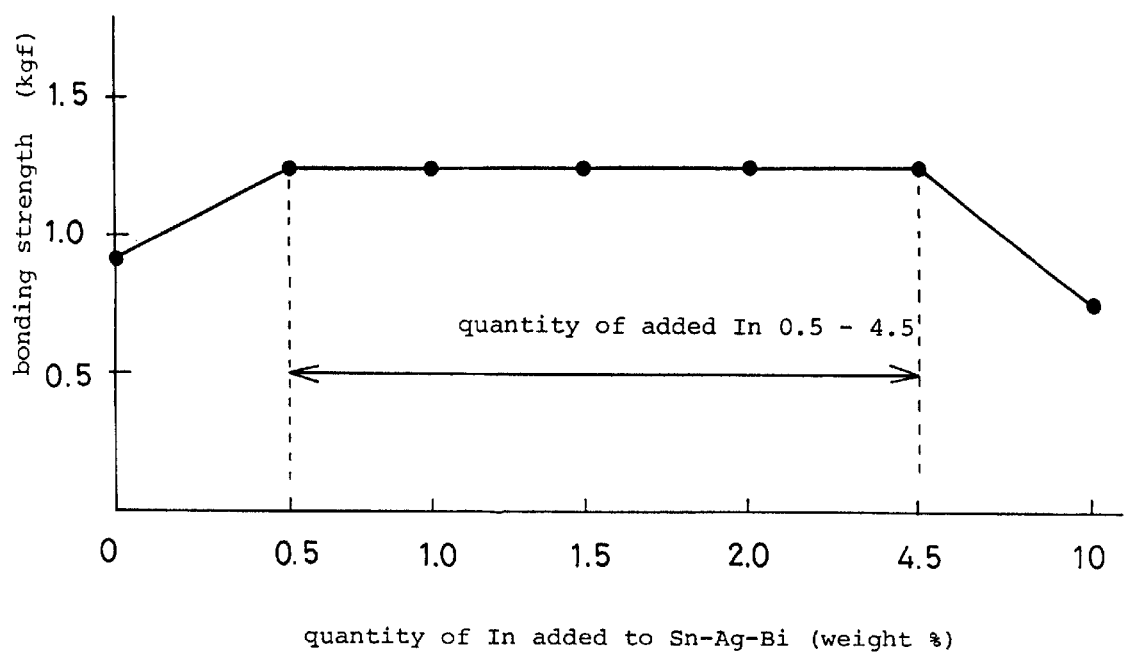
FIG. 4 is a graph of experimental data in which the abscissa represents the amount of In, in weight %, added to a Sn—Ag—Bi ternary alloy. The ordinate represents bonding strength in kgf.

FIG. 4 shows that the bonding strength of the alloy increases as the quantity of added In increases from 0.5 to 4.5 weight %. And although the quantity of Ag in the alloy in the figure is 3.5 weight %, the inventors have found that they achieve the same result when Ag is present in the alloy in an amount of 2.0 to 4.0 weight %.

Figure 5:
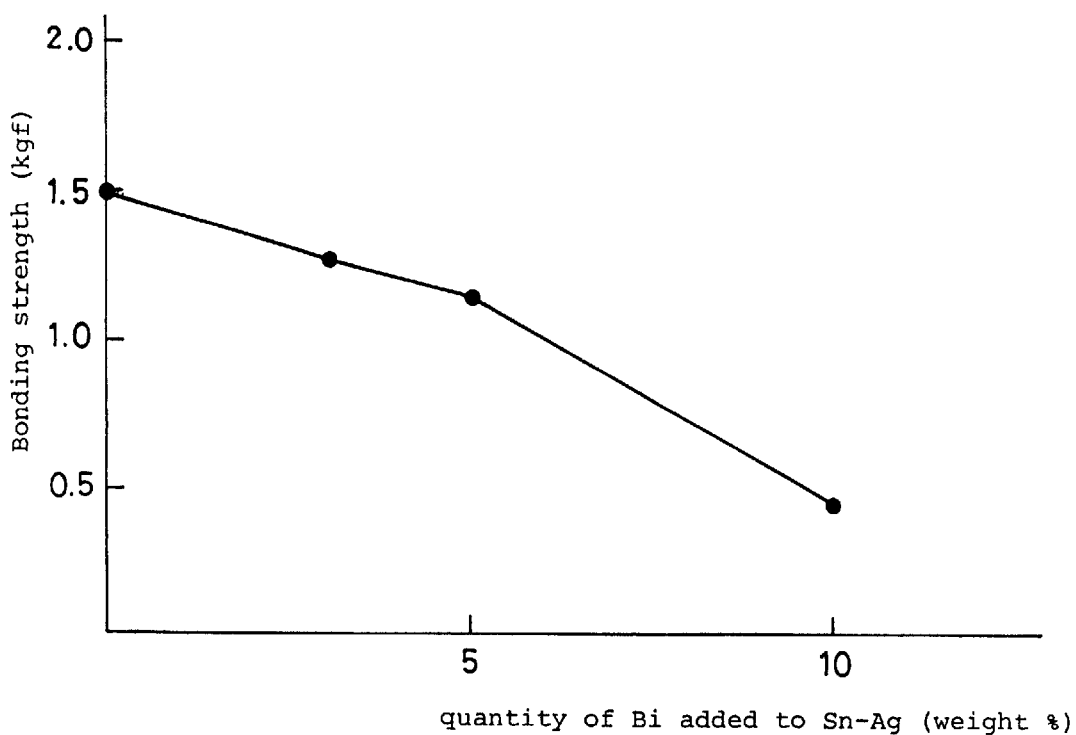
FIG. 5 is a graph of experimental data in which the abscissa represents the amount of Bi, in weight %, added to a Sn—Ag alloy. The ordinate represents bonding strength in kgf.

FIG. 5 shows that adding Bi to an Sn—Ag to form a ternary Sn—Ag-Bi alloy having more than 5 weight % of Bi in an effort to lower the melting point causes a rapid decrease in mechanical strength. This problem is caused by growth of the Bi phase in the alloy, making it necessary either to restrict Bi phase growth or to disperse Bi finely in the alloy to improve the bonding (mechanical) strength. It is for this reason that a quench solidifying process is used, so that the mechanical strength of the alloy is improved.

What is claimed is:

1. A soldering alloy consisting essentially of Sn, Ag, Bi, and Cu, wherein said alloy contains 77 to 92 weight % of Sn, 2.0 to 4.0 weight % of Ag, 5 to 18 weight % of Bi and 0.1 to 0.75 weight % of Cu.

2. A cream solder prepared by adding a flux to the soldering alloy of claim 1.

3. A soldering method comprising:
   providing a soldering alloy consisting essentially of Sn, Ag, Bi and Cu, wherein said alloy contains 77 to 92 weight % of Sn, 2.0 to 4.0 weight % of Ag, 5 to 18 weight % of Bi and 0.1 to 0.75 weight % of Cu, and
   quenching said soldering alloy to solidify same and finely disperse intermetallic compounds, thereby increasing the mechanical strength of said soldering alloy.

4. A soldering method comprising:
   providing a soldering alloy consisting essentially of Sn, Ag, Bi, and In, wherein said alloy contains 76 to 92 weight % of Sn, 2.0 to 4.0 weight % of Ag, 5 to 18 weight % of Bi and 0.5 to 1.5 weight % of In, and
   quenching said soldering alloy at a quenching rate of about 10° C./second to solidify said soldering alloy and finely to disperse intermetallic compounds, thereby increasing the mechanical strength of said soldering alloy.

* * * * *